(12) United States Patent
Roberts et al.

(10) Patent No.: US 6,792,605 B1
(45) Date of Patent: Sep. 14, 2004

(54) METHOD AND APPARATUS FOR PROVIDING WEB BASED SERVICES USING AN XML RUNTIME MODEL TO STORE STATE SESSION DATA

(75) Inventors: Andrew F. Roberts, Melrose, MA (US); Jonathan W. Booth, Portsmouth, NH (US); Michael R. Burati, Chelmsford, MA (US); Thomas E. Beauvais, Exeter, NH (US); John T. Serfass, Jr., Portsmouth, NH (US); Joseph Sommers, III, Stratham, NH (US)

(73) Assignee: Bow Street Software, Inc., Tewksbury, MA (US)

(*) Notice: Subject to any disclaimer, the term of this patent is extended or adjusted under 35 U.S.C. 154(b) by 0 days.

(21) Appl. No.: 09/329,606

(22) Filed: Jun. 10, 1999

(51) Int. Cl.[7] .............................. G06F 3/00; G06F 15/16
(52) U.S. Cl. ....................... 719/313; 719/315; 719/316; 719/317; 709/202; 709/219
(58) Field of Search ................................. 709/201–203, 709/217–219, 228–230, 225, 238, 231; 707/507, 522, 104, 3; 379/900; 719/313–317

(56) References Cited

U.S. PATENT DOCUMENTS

| | | |
|---|---|---|
| 5,548,726 A | 8/1996 | Pettus |
| 5,592,597 A | 1/1997 | Kiss |
| 5,680,523 A | 10/1997 | Watkins et al. |
| 5,687,304 A | 11/1997 | Kiss |
| 5,717,860 A | 2/1998 | Graber et al. |
| 5,742,762 A | 4/1998 | Scholl et al. |
| 5,764,906 A | 6/1998 | Edelstein et al. |
| 5,778,367 A | 7/1998 | Wesinger, Jr. et al. |
| 5,793,966 A | 8/1998 | Amstein et al. |
| 5,812,769 A | 9/1998 | Graber et al. |
| 5,813,006 A | 9/1998 | Polnerow et al. |

(List continued on next page.)

OTHER PUBLICATIONS

Lightweight Cell Directory Service Deamon, IBM Technical Disclosure Bulletin (NN9411307), Nov. 1994, pp. 307–308.*

Efficient Scheduling Mechanism for Distributed Computing Environment, IBM Technical Disclosur Bulletin (NN9407533), Jul. 1994, pp. 533–536.*

*Primary Examiner*—Jack B. Harvey
*Assistant Examiner*—B. Prieto
(74) *Attorney, Agent, or Firm*—J. D. Harriman, II, Esq.; Coudert Brothers LLP

(57) ABSTRACT

The present invention provides a method and apparatus for accessing and using services and applications from a number of sources into a customized application. The present invention accomplishes this through an entity referred to as a web service. The web services architecture maintains a directory of services available to provide processing or services, along with the location of the services and the input/output schemas required by the services. When a request for data or services is received, appropriate services are invoked by a web services engine using service drivers associated with each service. A web services application is then generated from a runtime model and is invoked to satisfy the request, by communicating as necessary with services in proper I/O formats. In one embodiment, the web services application provides responses in the form of HTML that can be used to generate pages to a browser.

16 Claims, 10 Drawing Sheets

U.S. PATENT DOCUMENTS

| | | |
|---|---|---|
| 5,828,842 A | 10/1998 | Sugauchi et al. |
| 5,832,506 A | 11/1998 | Kuzma |
| 5,838,331 A | 11/1998 | DeBry |
| 5,855,020 A | 12/1998 | Kirsch |
| 5,860,068 A | 1/1999 | Cook |
| 5,864,668 A | 1/1999 | Andert et al. |
| 5,870,562 A | 2/1999 | Butman et al. |
| 5,878,219 A | 3/1999 | Vance, Jr. et al. |
| 5,884,035 A | 3/1999 | Butman et al. |
| 5,890,171 A | 3/1999 | Blumer et al. |
| 5,895,462 A | 4/1999 | Toki |
| 5,918,214 A * | 6/1999 | Perkowski .................... 705/27 |
| 5,991,823 A * | 11/1999 | Cavanaugh, III et al. ... 709/304 |
| 6,016,499 A * | 1/2000 | Ferguson .................... 707/104 |
| 6,067,559 A | 5/2000 | Allard et al. |
| 6,125,391 A | 9/2000 | Meltzer et al. |
| 6,154,738 A * | 11/2000 | Call .............................. 707/4 |
| 6,199,062 B1 * | 3/2001 | Byrne et al. ................... 707/3 |
| 6,260,039 B1 * | 7/2001 | Schneck et al. .............. 707/10 |
| 6,560,633 B1 * | 5/2003 | Roberts et al. ............. 709/202 |

* cited by examiner

METHOD AND APPARATUS FOR PROVIDING WEB BASED SERVICES USING AN XML RUNTIME MODEL TO STORE STATE SESSION DATA

BACKGROUND OF THE INVENTION

1. Field of the Invention

This invention relates to the field of providing network services.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

A large number of businesses rely on other businesses as part of their functionality. For example, a distributor of products relies on all of the different manufacturers of the products to reliably supply not only the products themselves, but information about the price and availability of the products. Manufacturers themselves also rely on parts suppliers to build complete products. To compete in a competitive business environment, it is necessary for companies to be able to provide rapid responses to customers about products and services. This often requires interaction with many other companies. In the past, a customer might have been willing to wait while a company representative made phone calls or referenced catalogs to provide answers to customer requests. But today, customers demand faster service, or the ability to obtain information themselves. In other cases, customers may not be interacting with a company representative at all, but with a company web site. In that environment, the customer requires even more rapid and efficient service.

One way for companies to stay competitive in today's business environment is to develop application programs (software) that allows them to interact with third party company computer systems to obtain information and services that are needed to operate the companies business. Traditionally, however, it has been difficult to create these applications. One problem is the difficulty in interfacing with the often proprietary computer systems of different companies. Another problem is the difficulty in writing and debugging the applications themselves, as well as updating them when conditions change or when third party companies change or update their own systems.

This change in business climate has also been driven in part by the internet. The internet has made information from multiple sources easily available to individuals. In addition, the internet has changed the way companies interact with each other. Business to Business interaction is now often accomplished via the internet. Often the relationship between businesses (such as between a distributor and its suppliers) is called a "channel relationship", or a "business channel".

There have been attempts to attempt to connect to back office systems, and then to move these configurations to the web, but they have been unsuccessful. One problem with current technological approaches to attempted mass customization of Web sites is that the approaches use fixed, tightly coupled processes that cannot be easily or dynamically changed. In order to create the business process of a Web application or to create a new application, a programmer has to change the software. Even when an application can be designed to branch based on certain conditions, today's approaches cannot branch in unanticipated directions in response to unanticipated conditions. Doing so requires that the code itself be changed. This is true even in "reusable" object-oriented approaches, because the processes still need to be recombined any time a change is made.

The technological approaches currently in use for Web application development each has its own limitations. Specifically, these are:

Procedural Programming. Procedure-based programming creates large, monolithic applications that have to be rewritten, recompiled, and tested each time even the smallest change is made. This process can take months or years and is unacceptable for this class of application.

Object-Oriented Programming. Corba, Enterprise JavaBeans, and Microsoft's COM all promise a high degree of code reuse through the use of modular components. However, the code reuse they enable is at design time and not at runtime. The applications developed under these object models use collections of objects or classes that are tightly coupled and require rewriting if changes are made. Although development time is improved, those savings are not leveraged with each new implementation. This is because the application has to be created again from the beginning, even though many of the same classes can be used over again. The code surrounding the components which ties them together has to be constructed manually by the programmer, and the components are flexible only to the extent that the component authors anticipated requirements for flexibility and built that into their code at design time. Object—oriented programming falls short of capturing the process that developers follow building the application and captures only the explicit results in source code.

Traditional Web Model. Traditional approaches to Web site design have used CGI scripts and other Web server extensions to implement business processes. CGI programs may have been written in Perl script or C and have been hard—coded, and tightly coupled. The same is true for Java servlets. They are hard to modify and to maintain. The Web has introduced a new application architecture that uses standard protocols and provides ways to link services together. However, as these are implemented today, the sites that are produced are limited in the extent to which they can be customized, and the business processes, which are represented on the site, are fixed. Changes are hard to make, and expensive, and they often impact the entire site. Producing another site often requires going back and recreating the site all over again. All of the same limitations of object—oriented programming apply in this model, except that different protocols are involved and the client is a browser.

All of these approaches fail to automate the creation and editing practice in which the developer engages. The software design point is wrong—business practices are being encoded at too deep a level. Rather than allowing processes to be captured at a high level and then driven with design parameters, these systems focus on encoding practices at a low level, where many assumptions and decisions that are made by the developers; are never captured. For example, when a call to an object's methods is coded through a low-level interface, if the method's interface changes, the developer must go in and manually edit the changes. This makes automated customization impossible.

Creating software applications to manage business channels is complex and inflexible using traditional techniques.

If a hard coded application is created, it may not be able to respond to new channels that are created or modified over time. Repeated recoding efforts may be required. In other cases, a company may be in a channel relationship with another company without the other company realizing it. For example, companies that use Federal Express or other shippers to transport goods do so without explicit formal relationships with the shipper. For the shipper, maintaining business channels with every company that uses it is a daunting, if not impossible task.

Traditional techniques focus on efficiency in the design of an application in the re-use of code, through object oriented programming for example, but do not provide efficiency or customizability at runtime of an application. With millions of companies making services available on the internet, there is a need to be able to efficiently create custom applications that dynamically invoke and interconnect a combination of web services, and configure themselves in customized formats at runtime. To date, the prior art has not provided effective solutions.

SUMMARY OF THE INVENTION

The present invention provides a method and apparatus for accessing and using services and applications from a number of sources into a customized application. The present invention accomplishes this through an entity referred to as a web service. The web services architecture maintains a directory of services available to provide processing or services, along with the location of the services and the input/output schemas required by the services. When a request for data or services is received, appropriate services are invoked by a web services engine using service drivers associated with each service. A web services application is then generated from a runtime model and is invoked to satisfy the request, by communicating as necessary with services in proper I/O formats. In one embodiment, the web services application provides responses in the form of HTML that can be used to generate pages to a browser.

DETAILED DESCRIPTION OF THE INVENTION

Figure 1:
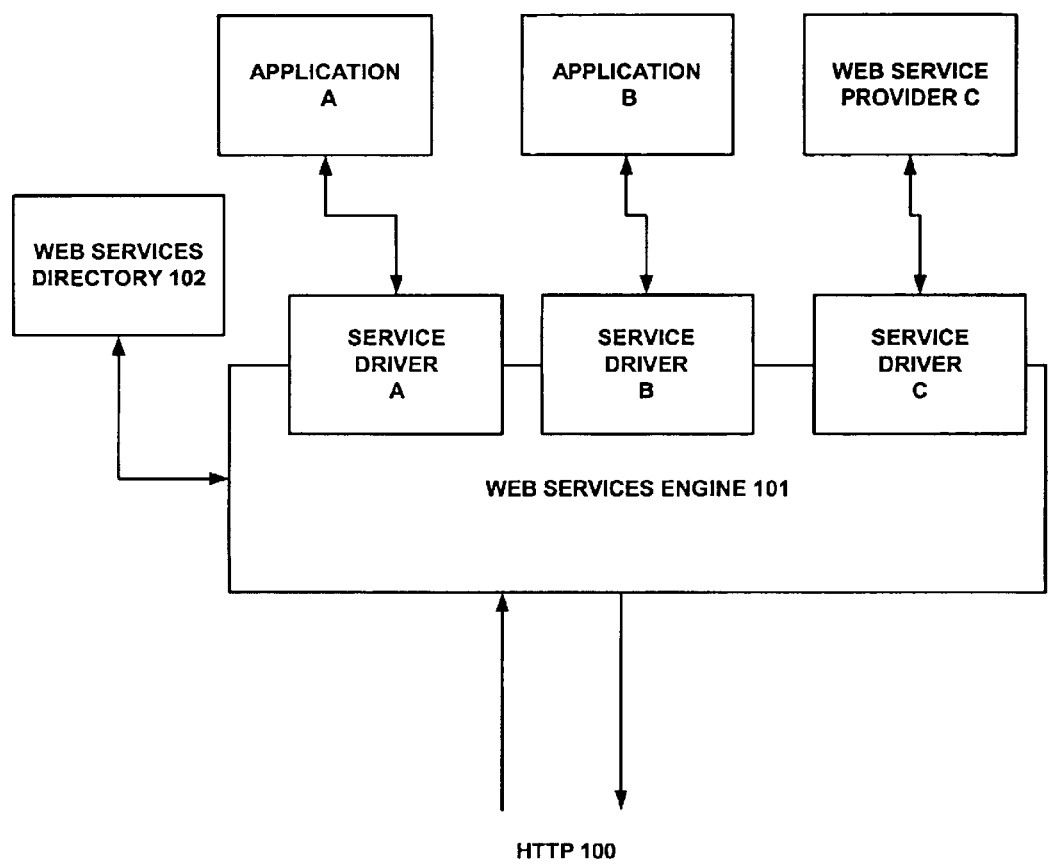
FIG. 1 is a block diagram of a web service architecture of the present invention.

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

The present invention provides a method and apparatus for creating applications that use available web services. Millions of services are being made available via the internet as well as through existing API's and other techniques. In the internet, many services are being made available as XML services. XML (extensible markup language) is a language used to describe information, or more accurately, to make information self describing. Traditionally, web pages are built using HTML. HTML (hypertext markup language) describes the geometry and appearance of a page of data, in effect creating holes or slots in which data is inserted. However, there is no direct communication of the data that appears on the page in the HTML description. A user might be presented with a page that includes recognizable information, such as name, address, and phone number. But to HTML, the data is simply text to display.

XML, on the other hand, provides a protocol where the type of data being used can be identified. XML can do this in part using predefined "schemas" that can be used to understand the type of data being transmitted. If a standard schema is used, the data need only include a reference to the schema, which need not travel with the data. If a custom schema is used, it can be sent before or after the data, or explicit directions to the location of the schema can be provided.

The present invention can take full advantage of XML based services, but is also applicable for use with any service for which communication protocols can be established.

The present invention provides a web services architecture, (referred to here as the "system"). The system provides information (in one embodiment, in the form of metadata) about web services that are available for use by web service consumers. In the present invention, a web service available for use is said to be "published" in a web services directory. The system provides access control, organization, interface definition, management, and operation of web services. The web services architecture serves as a centralized location from which web service consumers can gain all information about a set of published web services. In addition, the web services architecture provides a central location from which web services can be run, despite the fact that the systems (applications) that perform the actual work of the individual web services are distributed throughout the Internet. For example, as noted previously, an individual web service may not even be aware that it is part of the web services architecture.

Any number of web service architectures may be created, with each web service architecture customizable. For example, a web service architecture can be created for a particular industry, such as the insurance industry. Insurance companies can then take advantage of that industry web service architecture to create custom applications that allow them to access and use some or all of the services (XML or other) that are available in the architecture.

The system of the invention is comprised of the web services directory and the web services engine. The web services directory is the database, while the web services engine is the processor that handles web service requests. An example of the system is illustrated in FIG. 1.

Referring to FIG. 1, in one embodiment, a web services engine interacts with the environment outside the system via HTTP interface 100. (Although the present invention is described by way of example of using HTTP protocol, the invention can operate with any request/response protocol without departing from the scope and spirit of the invention). A web services directory 102 is coupled to the web services engine 101 and contains the published services that are available to the system. In the example of FIG. 1, these services are provided by applications A and B and web service provider C. The interface to the service providers are via service drivers A, B, and C, respectively. Please note that a service may be a web service system, a back end database or processing system, a software application, a web site, a database, an FTP site, or any system that can be made to respond to requests or queries.

In the example of FIG. 1, Applications A and B may be in-house applications or back end systems, or stand alone or third party applications, or applications accessed via the web, and the web service provider may be the company's own or a third party web service provider. The operation of the system involves receiving a request via http interface 100, using the web services engine to interpret the request and determine what services are needed, using the web services directory to identify services available to satisfy the request, and to direct appropriate requests to the appropriate services via service drivers. When the response(s) return, the web services engine builds the response(s) into a reply to the HTTP request and provides it the requester.

An embodiment of the present invention can be understood by understanding the details of web services, the directory, the engine, the drivers, and how they interact together. Below, web services are described in more detail.

Web Services

A web service is a unit of computer processing that takes in a packet of request information and provides a packet of response information. The protocol for a web service in one embodiment is HTTP. However, the protocol can be any suitable protocol or any future protocol. HTTP is used as an example for one embodiment. The request and response data format is XML in one embodiment, but it could be any other suitable format or combination of formats, including, but not limited to, HTML, MIME encoded types such as gif, or any other format. A web service is represented by a URL, along with a schema that defines the range of input and output data formats.

Web services exist throughout the Internet. Traditional URL's can be considered to be web services, with the caveat that the traditional URL response formats follow an implied schema, HTML, or mime encoded data such as an Adobe Acrobat file that causes the browser to load a special application dedicated to the specified file format. In other words, any entity that is capable of receiving some information and providing some response, is potentially a web service. Some examples of such services include processing services made available internally and externally by a company. Federal Express makes its package tracking feature available as a service accessible through the internet. Other services could include inventory tracking, product purchase, bill payment, credit checking, custom new and information collection, financial services and others.

In the system of the present invention, a web service is represented in one embodiment externally as a URL that the web services engine processes to generate an HTTP response. While the web services engine is processing the web service, it employs software called a web service driver to perform the work. This driver can be self contained, or it can execute API's to interact with other systems. It can also request execution of web services that are maintained by other systems. As noted above with respect to FIG. 1, web services can be provided by other web service providers.

Inside the web services architecture, a web service is comprised of two components. The first is a block of metadata that is stored in the web services directory; the second is a web service driver (implemented as a Java class in one embodiment of the invention) that runs in the context of the web services engine.

The web service metadata block defines the schema of the web service's input and output interfaces, as well as configuration parameters that are used to configure the web service driver. In addition to having a metadata block that defines the "what" and "how" of a web service, a web service is represented by an entity in the web services directory. This entity provides location information and access control privileges on the web service. As such, the directory provides the "who", "where", and "why" information associated with web services.

Operation of Web Services

Web services are invoked from outside the web services engine in the form of HTTP gets and posts. Every request to a web services engine is interpreted to be a request to run a particular web service. A request to a URL in the web services engine is interpreted to contain information that identifies the target web service, and the input data in the form of HTTP get/post parameters.

Figure 3:
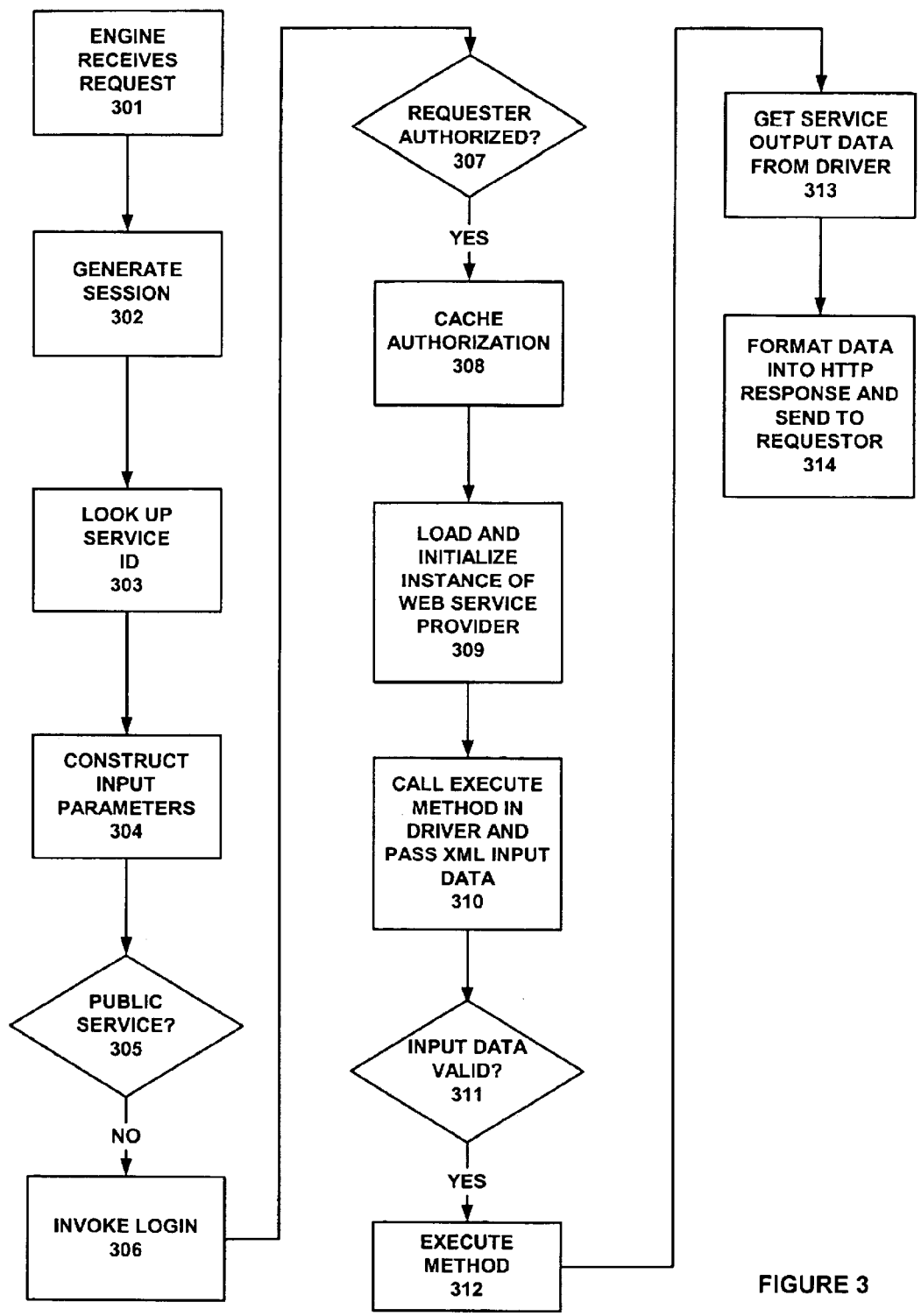
FIG. 3 is a flow diagram of the operation of the present invention.

FIG. 3 is a flow diagram illustrating the processes carried out by the web services engine and directory in the execution of a web service.

The web services engine receives a request in the form of an HTTP post or get at step 301. At step 302, the engine generates a session which is a unit of program code dedicated to maintaining the status and state of the request until a response has been sent back.

At step 303, the system looks up the service ID in the web services directory using a set of web services that communicate via LDAP to the web services directory. The system parses the HTTP get/post parameters and constructs a set of input parameters at step 304 in the session to represent the web service's data inputs.

The service ID is identified in the request URL using directory based parameters that identify the common name (cn), organizational unit (ou), organization (o), and country (c). A typical URL looks like the following:

http://bowstreet:9090/LDMServlet?ServiceID=cn= Demo,ou=Demo,o=BowStreet/c=US

Note, the above is for example purposes only. In another embodiment, the use of DNs may be replaced with use of a Unique Name (eg, like an MS GUID, but perhaps more human readable) such as "com.customerFoo.template.quarterlyReportGenerator". Other suitable conventions and protocols may be used without departing from the scope of the present invention.

At decision block 305, the system checks the access privileges to this service. If it is a public service, then the system proceeds to step 308. If it is not a public service, then the system redirects the initial request to a Login Servlet at step 306 that sends back a login response page for the requester to fill in and return. In one embodiment, this response follows a defined schema which can be interpreted by either a human sitting in front of a browser screen, or program at the requester end. The login page requests the user name and password of the requester. (Note that since the response data that requests ID and authentication is a packet of XML in one embodiment, this can support any form of challenge data).

In addition, other schemes other than the Login Servlet may be used with the invention. Other embodiments could include the template itself using the Login Service, and/or the system redirecting to a Login Service.

When the requester sends back a new request containing the same service request in addition to the ID and authentication information, the web services engine checks for access rights to run the web service by binding to the directory as the requester, and checking to see if the requester is authorized at step 307. The authorization check can be implemented by a pluggable authorization handler. Another embodiment could include a handler that performs authorization based on roles and/or flexible policies.

The fact of authorization is cached with the user's session by the web services engine. Service metada and request information is used by the web services engine and the service driver itself (step 308). The session maintains state and other data that needs to be saved across requests.

At step 309, the system loads an instance of the web service driver, and initializes it. The system passes the handle to the session, as well as the service parameters defined in the web service metadata the service parameters are used by the driver for configuration purposes.

After initialization, at step 310, the system calls the execute method in the service driver, and passes the XML input data. Before execution begins, the system checks at decision block 311 to see if the input data is valid according to the web service's input data schema.

The web service driver performs its work in the execute method at step 312. This work can include calling other web services in the system or invoking any functionality via an API or other protocol. The scope of what a web service driver can do is unlimited.

At step 313 the system gets the service output data from the driver, and formats the output into an HTTP response, which it sends back to the requester at step 314.

The system shuts down the service driver, but not the session dedicated to maintaining the state of the service interaction with the requester. The system maintains this session so that the same requester can make additional requests to services that connect to the same session and utilize its state. Web services can send back information in their responses that serves to identify the session handle. This information is frequently sent back in subsequent requests for web services that need to tap into the session and make use of the state information.

Figure 4:
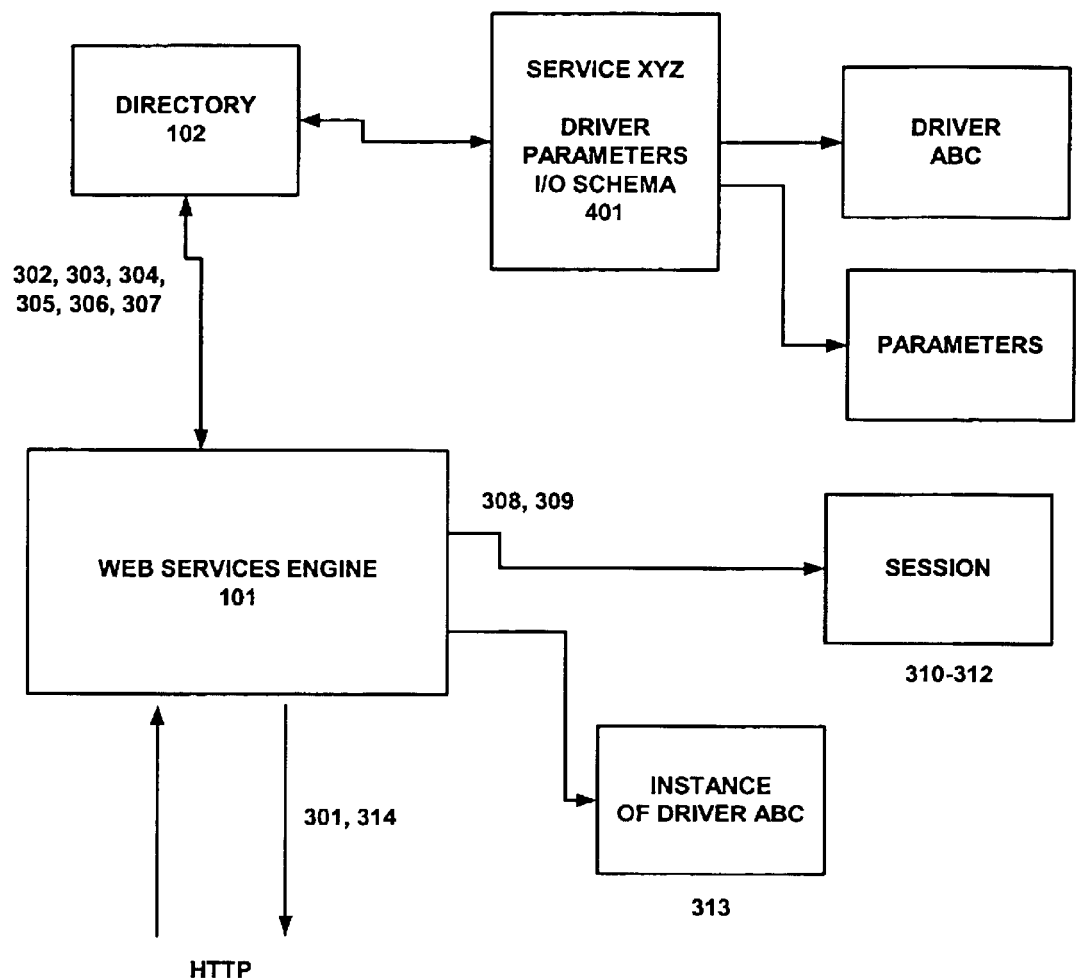
FIG. 4 is a block diagram illustrating components of the invention during operation of FIG. 3.

The operation of the flow diagram of FIG. 3 is illustrated diagrammatically in FIG. 4. The web services engine includes a web server portion that manages the session. The service driver name and associated parameters, along with the I/O schema are obtained for the service via the directory 102. FIG. 4 illustrates the entities that execute actions associated with the steps of FIG. 3. As might be expected, the HTTP interface is where steps 301 and 314 take place, namely receiving the HTTP request and providing an HTTP response.

Creating a Web Service

There are a number of steps that a user performs in creating a web service. Once a web service has been created, a user can modify the web service. The steps are as follows:
1. Specify high level metadata, including ID, location, and access privileges for the service
2. Identify a service driver class
3. Supply any web service parameters that "configure" the service driver for use by this web service
4. Define the XML input and output interfaces (schemas)
1. Specifying High-level Service Metadata The creator of a web service specifies a unique ID for the web service, within the space of the directory. Versioning of the web service is independent of the ID. The user identifies the container to locate the web service in the directory, and specifies the list of directory users who can edit, as well as run the web service.

Next, the author identifies the web service's driver class. This is, for example, in one embodiment, a special Java class file that is placed on the file system and made accessible to the web services engine via file and URL access web services.

It is possible for many web services to utilize the same service driver class. Typically, a number of web services will use a common service driver, but will supply different service parameters. For example, multiple web services using a common email driver class would each supply the name of a different email server in the parameters. This way, each web service would communicate with a different external system, even though they all used the same service driver class.

3. Specifying Service Parameters

A web service can supply a set of service parameters to the service driver upon invocation of the web service in the web services engine. These inputs are defined as blocks of XML data that follow the service parameter schema of one embodiment of the invention. In other embodiments the structure of these parameters follow any schema, since the service driver knows how to interpret these parameters, and not the web services engine. These parameters may be obtained at runtime from a URL.

Examples of service parameters associated with commonly used service driver classes are: the e-mail server name for the e-mail driver class, the URL to be called by the HTTP driver class, the runtime model content for a model runner driver class.

4. Specifying the Web Service Input and Output Interfaces

Each web service has a definition of the input and output data schemas. There are several ways to supply these schemas. One approach has been developed to date, and a second is in development.

The current approach is to use a supported service schema. This schema defines inputs and outputs as lists of XML structured parameters from a set of supported data types. Each input and output data entity is defined by supplying a name and selecting a primitive data type such as number, text string, and vector of W3C compliant DOM nodes.

The second, approach is to supply a URL that represents an XML document that follows one of a set of recognized, standard XML schema vocabularies such as DTD, or XML Schema (still under development by the W3C). With this approach, the web service input and output schemas can be maintained outside the web services directory, and can follow a more diverse and versatile set of schema vocabularies that is constantly changing over time.

Web Services Directory

As noted above, the system uses a web services directory as a database of information about the services available to the web service engine. The system uses the directory to persist various forms of metadata that serve as its database. A web service architecture may be created for a particular industry with a consistent set of services. Companies in that industry wishing to build applications using the architecture may not take advantage of all available services. Each company can create custom systems that use some or all of the available services.

Web services are represented in the directory as entities, in a manner similar to the way people and network resources are represented in a directory. Web services are located in a directory within the directory's hierarchical container structure.

The system provides a mechanism for publishing the existence and availability of web services. Web service entities contain information describing the input and output data formats, the location of the application code, (i.e. the web service driver) that performs the processing of the service, and a set of web service parameters that are used to initialize the web service driver.

One of the main roles of the system is to publish web services. Often the web services are identified by a URL. If a web service URL exists somewhere on the Internet, the system can create an entity in the web services directory that represents this service's interface. This makes it possible to request execution of a set of web services in the system that report back the existence of published web services, and it also makes it possible to request execution of this web service from the system, which can invoke the web service via an HTTP based service driver.

When a web service's interface has been published in the system, other web services can query the web service's interface and use this information in the synthesis of programs that call this web service.

The system implements the directory in one embodiment using the Lightweight Directory Access Protocol (LDAP) protocol. One example of a service embodiment is described in Section A attached hereto, titled "Service Definition".

The system operates with a number of industry standard directory products. These include the Novell NDS directory, IBM SecureWay directory, Microsoft Active Directory, and Netscape Directory. The system utilizes LDAP to communicate with the directory, but it is in no way limited to this protocol.

The web services architecture provides the following functionality.

(Note that some of this is provided by the underlying directory product).

1) Administering the installation and operation of the system
2) Creating and managing users and groups
3) Creating and managing web services
4) Getting information about web services
5) Running web services

Service Driver Class

A service driver serves as the gateway to application functionality outside the web services directory, located on any system, that can perform the work of a web service. For example, a service driver could invoke a spreadsheet through an OLE interface, and perform numerical computations. A service driver could communicate with a message queue system. A service driver could issue an HTTP request to a URL anywhere on the Internet. A service driver could serve as an interface to a library of Fortran programs, or it could communicate with an enterprise application such as SAP through its Business API's (BAPI's).

The web service driver class is, in one embodiment, a special Java class file that is placed on the file system and made accessible to the web services engine via file and URL access web services. A web service's driver performs the execution of the web service in the web services engine. A service driver is, in one embodiment, a Java class that can interact with a program outside the web services directory using either an API or an Internet protocol such as HTTP. Although this embodiment describes a Java class, the invention is not limited to Java classes and may use any suitable scheme for implementing a service driver.

In the system of the present invention, a web service driver can also request execution of other web services that are maintained by the system. In this case, the system does not issue an HTTP request to the web services engine (i.e. go outside the session to HTTP and back in). Instead, service drivers are given the ability to communicate directly with the web services engine through an API. As a result, a web service driver can invoke other web services and pass data directly in XML DOM format, without having to map this to HTTP.

Figure 2A:
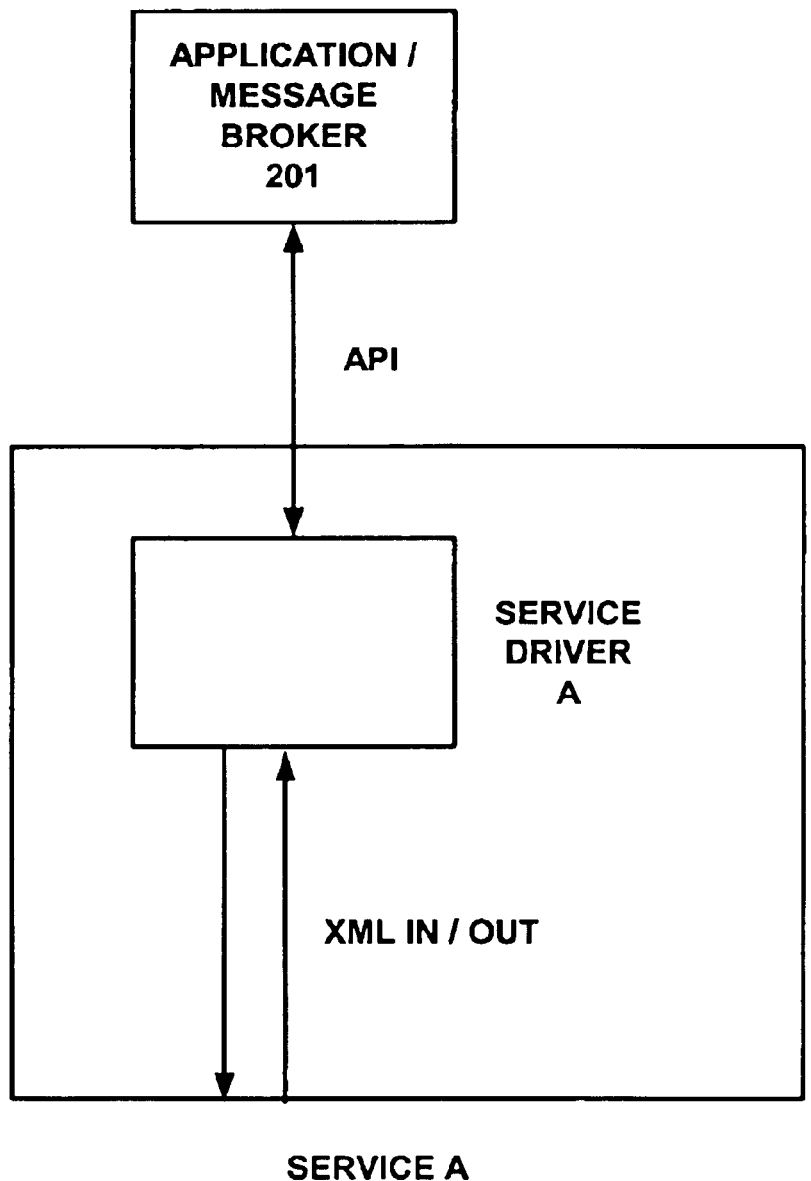
FIG. 2A is a block diagram illustrating an API based driver.
Figure 2B:
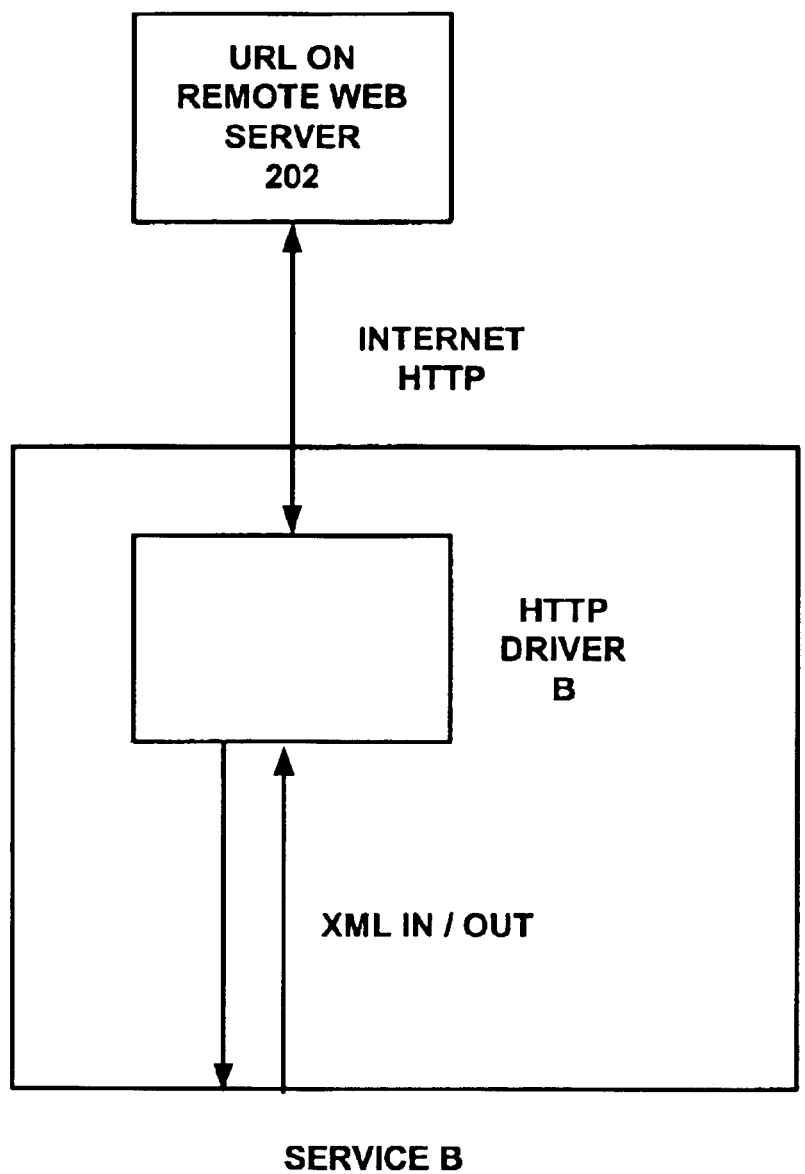
FIG. 2B is a block diagram illustrating a URL based driver.

This is shown in FIGS. 2A and 2B. Referring first to FIG. 2A, an example of remote procedure call/application programmer interface (RPC/API) accessible applications is shown. The system interacts with the service via.XML in/out interface. Service driver A converts XML requests to satisfy the appropriate API of the application or message broker 201 being accessed and forwards the reconfigured request. The application returns a response, which the Service Driver A converts into an XML response.

In FIG. 2B, the service is an internet accessible application 202. An XML request is provided to HTTP driver B, which converts it into an internet HTTP format to the service URL. The service 202 returns a response that is converted to XML output by HTTP driver B.

The service driver class is derived from a base driver class. The driver class has an execute method which is where service driver authors establish uniqueness. The execute method accepts a structure of DOM entities (W3C compliant document object model) as the input data, and produces a structure of such entities as the output data.

The execute method of a service driver can perform a substantially limitless amount of functionality. The only prerequisite is that it eventually complete its processing and return control to the web services engine. Since some of the state information utilized by a web service driver is cached in the requester's session (note the driver itself need not be cached), other web services later interact with this session data. Note that service drivers are different from objects in object request broker systems (ORB's), where an outside system gets a handle on an object, and can repeatedly call into that object's methods. In the web services architecture, a web service represents an atomic unit of computing that runs its course, and shuts down. Repeated interaction with the same session state is accomplished by having different web services connect to an existing session and interact with the state in some way. We will see later that there is a special type of web service, called a model runner service, which accepts as service parameters a block of instructions for building a session state that declares functionality, behavior, and data content. Once this web service has run, other web services can connect to this session, and execute actions defined in the session. These web services use a service driver that accepts a handle to a running model in an active session.

It should be noted that web services have a finite task defined in a single execute method in the service driver. In one embodiment, web services don't support repeated interactions. However, the systems that they interact with during the course of their execution can, and very frequently do, support state preservation. A database query service is a good example of such a service.

Web Services Engine

The web services engine 101 is the program that interacts with web service requesters and the web services directory. In addition, as the web services engine 101 executes web services, it runs web service drivers, which can invoke other programs via Internet protocols or API's.

One of the most significant activities that the web services engine performs is the execution of multiple web services in the context of a single session. The web services architecture supports a type of XML object called a runtime model, which defines the context in which multiple web services are to be executed. When a web services engine receives a request to run a service that utilizes the model runner driver with a specified runtime model, the system generates something called a web services application (WSA) in the session.

The web services engine manages the caching of WSA's. The web services directory manages the persistent forms of the runtime models that are used to generate WSA's. The web services engine implements the invocation of WSA's through the use of web services that utilize the model runner driver.

A web services application is a dynamic collection of information and business processing services available through web interfaces and XML. A WSA can be thought of as an application, but has runtime customization. WSA's, through the web services architecture of the present invention, can interface with hundreds of different available services without the need for hard coding of specific tightly coupled interfaces to run processes across company boundaries. In one embodiment of the present invention, WSA's are generated from runtime models.

Runtime Model

A runtime model, and the web services application it generates, is the recipe for a complex new form of application. A runtime model declares multiple actions, each of which can be bound to the execution of elaborate functionality defined in functions. In addition, a runtime model declares multiple parameters which are used as web service inputs and outputs. And finally, a runtime model draws on the use of a number of web services that construct special user interface pages as output data. The behavior of these pages is to generate subsequent web service requests to the web services engine, and to call for the execution the actions defined in a web services application session.

Without runtime models and WSA's, the web services architecture is atomic, meaning that the only activity during the processing of a request to the web services engine is the execution of a single web service. Such a limitation is inadequate to provide the trans-boundary application and service processing needed for flexible solutions on the web. WSA's enable the web services engine to perform complex tasks involving many web services. In addition, WSA's enable web service requesters outside the web services engine to interact with a single session state, across requests.

Operation of WSA's

When a request to the web services engine invokes a WSA, the system processes the request and generates a response. The response can be in XML, HTML, or any format supported by Internet wire protocols. Often times, but not always, a web service request generates a response that takes the form of a graphical user interface to be displayed in a browser. This is the case when the requester (web service consumer) is a web browser. The returned user interfaces often have embedded controls in them that react to subsequent user generated events, and cause the browser to generate subsequent HTTP requests back to the web services engine. These requests are often targeted at the same WSA. In the web services architecture, it is possible for a single WSA session on the web services engine to maintain its state throughout a number of interactions with different requests, generated by different user interfaces. For example, it is possible for a WSA to generate an initial page of UI as the response to an initial request. This UI could contain a button. When the user presses the button, the browser generates a new request targeted against the same WSA. The web services engine invokes a service that enables the existing WSA to process the request, and generate another UI page.

Figure 5:
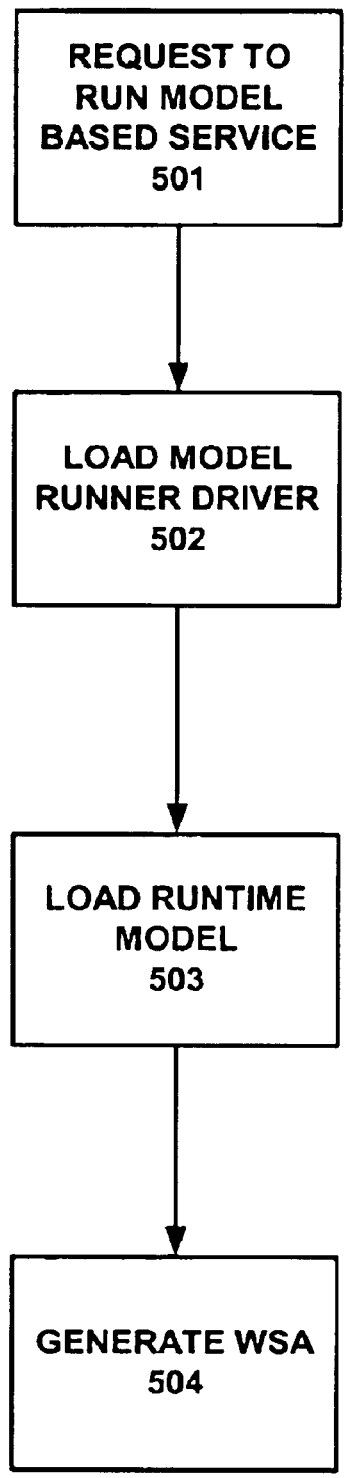
FIG. 5 is a flow diagram of generating a web services application in an embodiment of the present invention.
Figure 6:
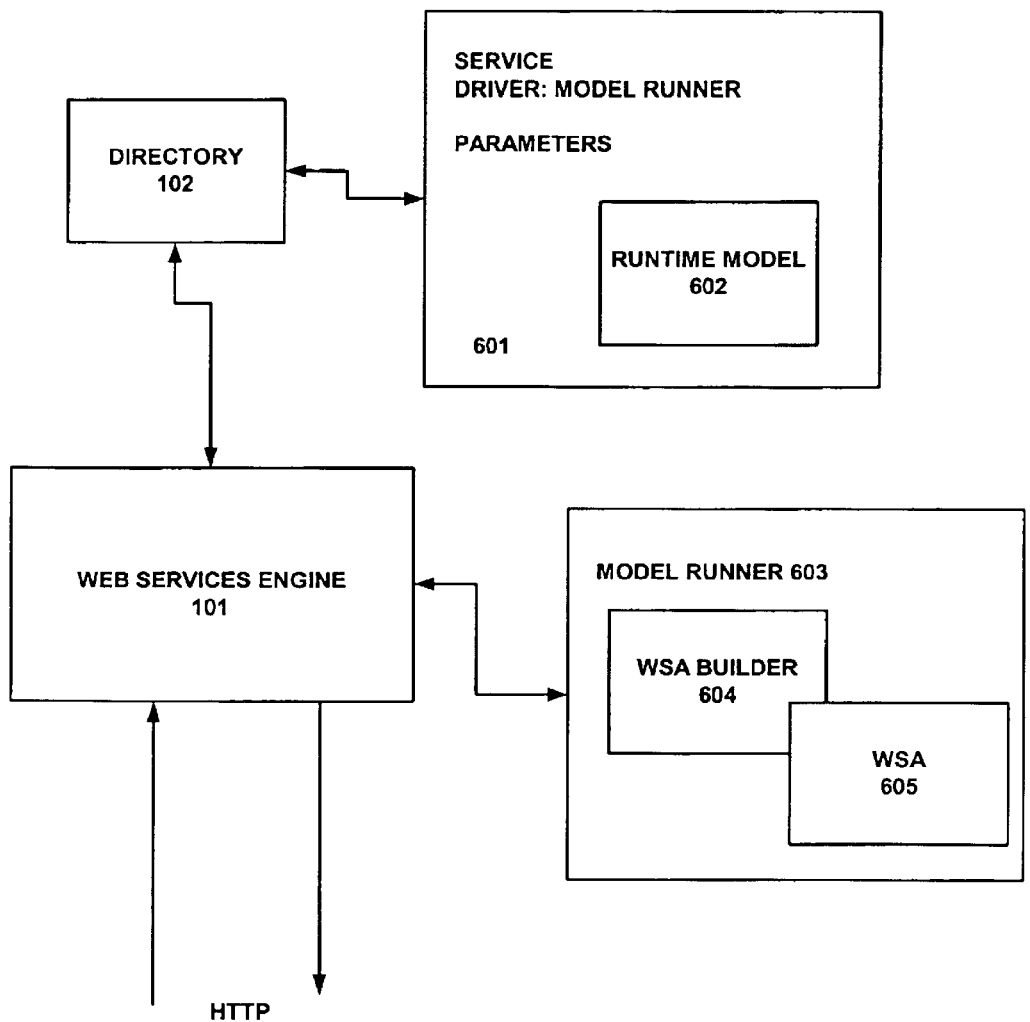
FIG. 6 is a block diagram illustrating components of the invention during operation of FIG. 5.

The operation of the web services architecture in running a WSA is illustrated in the flow diagram of FIG. 5 and the associated block diagram of FIG. 6. When a requester wants to run a WSA, the requester generates an HTTP request to run a special type of web service 601 called a "model-based" web service at step 501. These web services 601 have the responsibility of maintaining the runtime models 602 corresponding to WSA's. These web services also reference a common web service driver called the model runner 603, which is responsible for taking the runtime model as a service parameter, and generating a WSA. At step 502 the model runner 603 loads the model runner driver from the service 601. At step 503 the model runner 603 loads the runtime model 602. The model runner 603, using the runtime model 602 as the service parameter, then generates the WSA 605 at step 504.

Once the web services engine has invoked an instance of the model runner driver, and has generated the WSA 605, the model runner driver calls an action called the "Onload" action defined in the WSA. (An action is similar to a statement in a function or method.)

The Onload action establishes the initial state of the WSA, and it performs the unit of work that generates the response data to the web services request. When the Onload action has finished running, the model runner driver saves the state of the WSA in the session.

The Page action is a special type of action used to generate response data in the form of an interactive UI. A Page action generates a packet of response data in either HTML or XML, that contains graphically presentable information along with user interface (UI) controls. The behavior of these controls can be set to generate subsequent web service requests to the web services engine, using the handle of the original WSA session.

Sometimes, a WSA does all its work in the Onload trigger, sends back its response data, and terminates without any intention of subsequent web service requests establishing downstream contact. Other times, a WSA generates response data that contains an embedded XML model session handle. This data enables a browser, or other system to make web service requests against the same WSA session.

Functionality of WSA's

The functionality of a WSA is defined by XML-based declarations in the runtime model, and the functionality provided by the invoked web services. The runtime model that declares the functionality of the WSA is used by the Model Runner driver to instantiate all of the involved web services invoked by the WSA. In addition, the runtime model contains declarations of logic (functionality), data structure, and behavior.

The behavior of a WSA is defined by a set of bindings of actions to events that are declared in the runtime model. Many of the events are those that would be generated by a user interacting with pages defined in the runtime model. As web services interact with a WSA, the WSA generates pages as response data, and these pages contain the behavior defining bindings of events to actions that call additional web services.

Upon startup, a WSA executes its Onload functionality. During execution, the model runner service driver makes calls to additional web services, which results in the web services engine engaging additional service drivers.

Once the initial web service request has been processed, and the response data has been sent back, the web services engine handles subsequent web service requests targeted at the model session of the already running WSA. These session specific requests each contain a model handle ID that enables the web services engine to engage a specified WSA. These requests also identify an action to execute in the WSA to perform the work of the web service request. For example, a WSA could have initially obtained a list of employees through its Onload activity, and sent this information in a page, as a response, down to the browser. In addition, this page could contain a button. When this button is pressed, the browser generates a web service request to run a specified action in the same WSA session. This time the request contains the ID of the WSA session. As a result, the button generates a request to run an in the running WSA, to obtain additional information on an employee whose status is already present in the WSA.

A WSA's state is represented by a set of XML parameters (including web service call data outputs). Parameters are XML containers for data, and they have XML schemas that define the type of data that is supported in the parameters. The data in parameters changes over time in the WSA session. By way of logic defined in functions, a WSA can assign parameter values to service call inputs, as well as direct the outputs of web service calls to parameters. A WSA serves as a brokering system for moving information into and out of web service calls managed by the web services engine.

Finally, a WSA supports the generation and update of fully interactive user interfaces. The user interface is comprised of a set of dynamically generated and updated XML entities called Pages. A Pages is a block of XML data (HTML being a subset), suitable for display by a browser (but in no way limited to view in a browser. A Page doesn't have to contain HTML)

User interface is an optional property of a WSA. Some WSA's have behavior that causes execution of functionality on startup, but then causes the WSA to shut down without generation of any UI. Other WSA's have behavior that causes execution of functionality on startup, with the generation of a UI page that gets sent back as a response to the original request to run the WSA. This generated UI can contain scripted behavior that causes the browser to generate subsequent service requests to the web services engine to connect to the running WSA, and invoke additional actions. In turn, these actions can result in the generation of a new or updated page that gets sent back as a response to the service request. Through this interaction, a WSA is capable of handling a complex interaction with a user, while at the same time performing web service call actions that engage web services that are distributed throughout the Internet.

Figure 7:
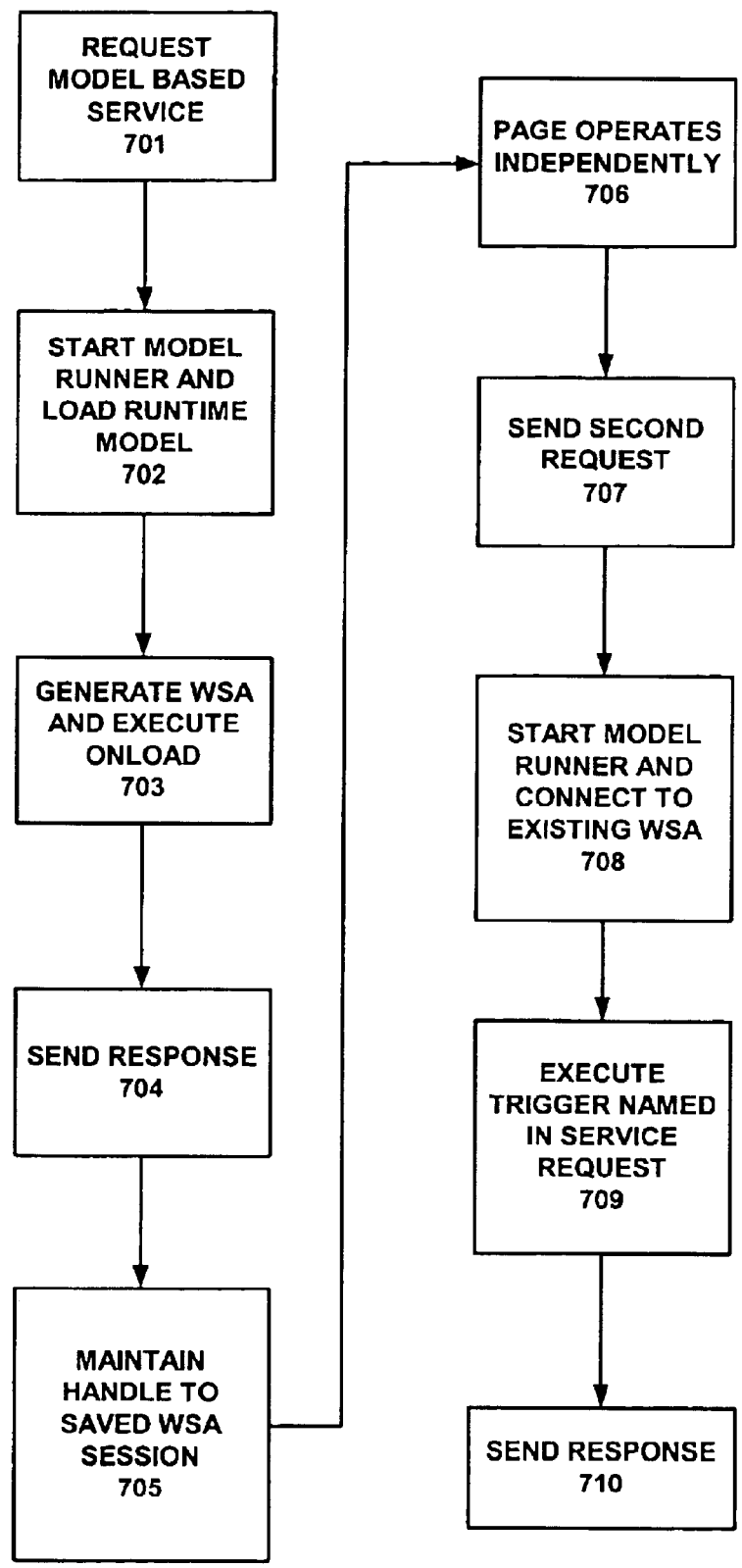
FIG. 7 is a flow diagram of the operation of an embodiment of the present invention.
Figure 8A:
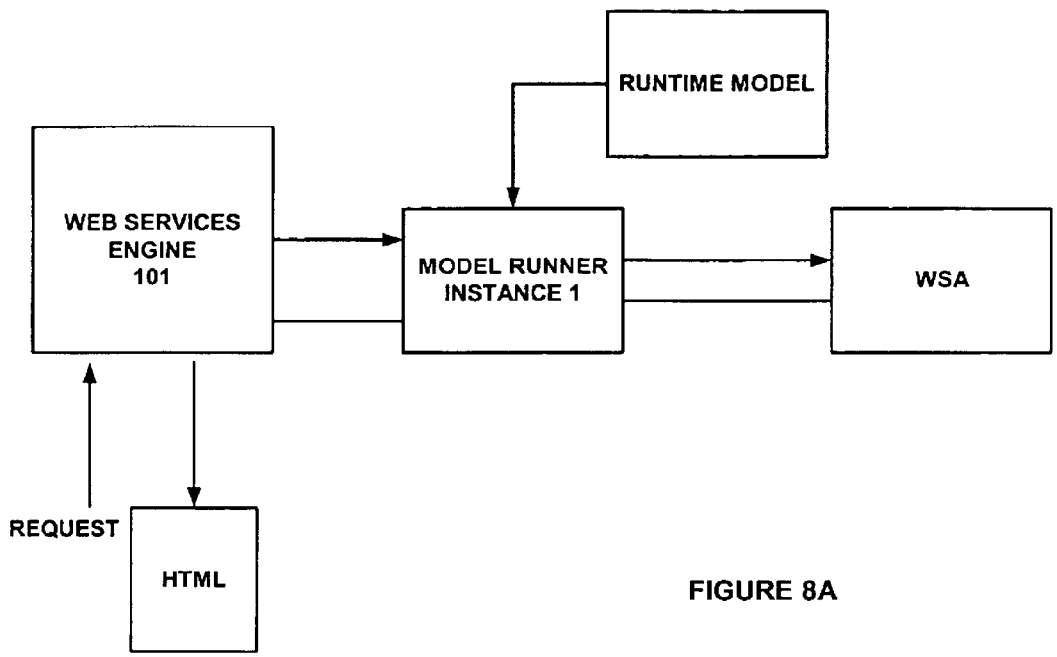
FIGS. 8A–8C are block diagrams illustrating components of the invention during operation of FIG. 7.
Figure 8B:
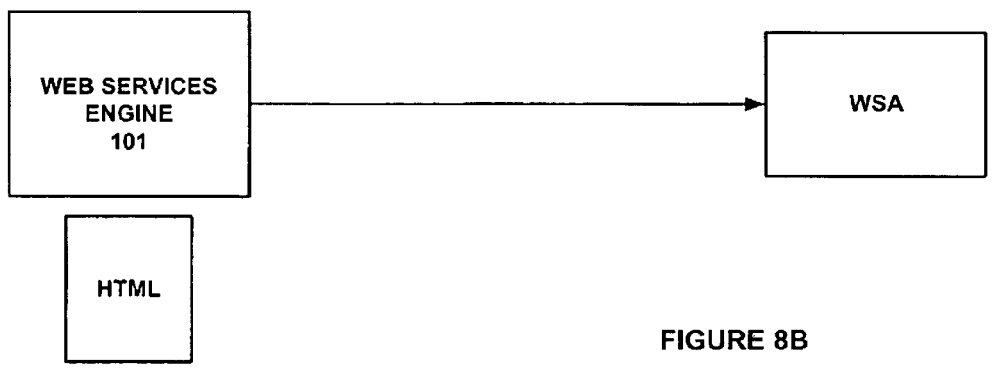
Figure 8C:
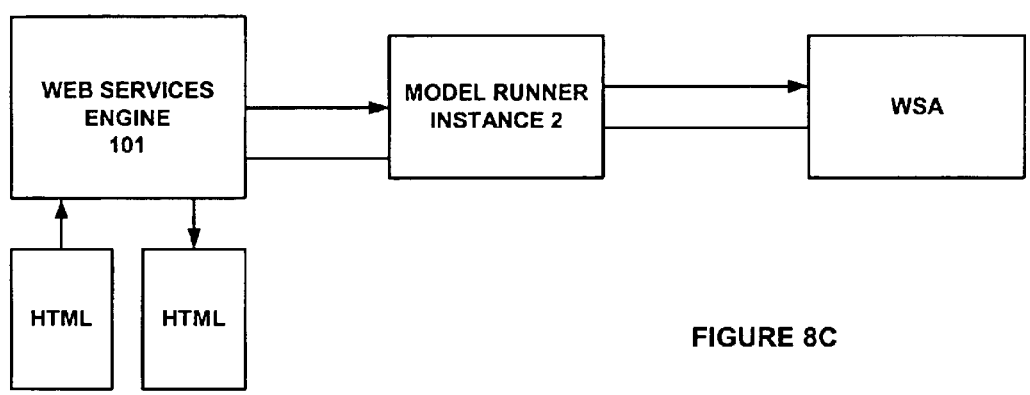

An example of the process of handling multiple requests against a common WSA is illustrated in the flow diagram of FIG. 7 and the associated block diagrams of FIGS. 8A through 8C. At step 701, a model based service is requested. The web services engine 101 starts the model runner instance 1 and the runtime model at step 702. At step 703, the model runner instance 1 generates a WSA and executes the Onload action. At step 704 the engine 101 sends a response to an HTML page.

At step 705 the handle to the saved WSA session is maintained by the engine 101. At step 706, the HTML page is operating on its own. As noted previously, the page may have buttons or other interactive devices that can be invoked by the user of the page. At step 707, a second request is sent from the page to engine 101. This time, at step 708, the engine starts the model runner to create model runner instance 2 and connects to the existing WSA. At step 709 the WSA executes the trigger action that is the subject of the second request and sends a reply to the engine. At step 710, a response is sent to HTML page.

Structure of Runtime Models

A runtime model is an XML document that declares the structure, functionality, and behavior of a WSA. (That is the current implementation of a runtime model. A runtime model can represent any XML data. For example, a runtime model can support 3D geometric data entities, or XSL—eXtensible Stylesheet Language entities). The model runner driver in the web services engine interprets the content of a runtime model in order to produce a WSA. (Note: other types of services could be written to handle interpretation of runtime model entities used for new applications). One or more embodiments provide for runtime models to follow a schema that is open and extensible.

Runtime models support a wide array of entities that describe different aspects of WSA's. Runtime models can declare functionality that results in multiple runtime models being invoked into WSA's that collaborate during runtime execution. This is accomplished by having runtime models declare calls to web services, that, in turn, make references to other runtime models.

The runtime model has a root node called a Model. The Model entity contains a set of sub-nodes. In one embodiment, this includes Pages, ServiceCalls, Triggers, Parameters, and Behaviors.

```
<?xml version="1.0" ?>
    <Model xmlns:LDS="" xmlns:LDT="" xml:space="preserve">
        <Pages/>
        <ServiceCalls/>
        <Triggers/>
        <Parameters/>
        <Behaviors/>
    </Model>
```

Pages

The Pages entity of a runtime model contains a set of individual page entities. A runtime model can have any number of pages. Pages serve as a vehicle for both content and UI that is suitably formatted for display in a browser.

Once the model runner service driver has produced a WSA, it executes a block of functionality in the WSA, that ultimately sends back a response to the requester. Many times, the response is in the form of an page, suitable for display in a browser.

Since a page as just another type of parameterized XML data in the WSA session, a WSA can utilize a page as output to a service request, or as input to another web service. This means that a WSA can send pages as inputs to a variety of web services. For example, a WSA could send a page to an email web service as the content of a message.

A Page entity contains the following entities:

```
<Page>
    <UniqueID/>
    <UserReadableName/>
    <Target/>
    <Contents/>
</Page>
```

The Contents entity in a Page contains any type of HTML, including nested XML. The Content section also contains XML entities that represent placeholders for data and controls.

One of the actions that can be called in a WSA is the Page action. This action invokes a web service, that applies a transformation to a set of Page entities in preparation for sending the data as a response to a service request. The Page action causes the system to insert parameter data into the data placeholders declared in the Page entities, and to write callbacks in the Page for any declared behaviors defined in the runtime model for that Page. The declared behavior and placeholder entities follow a scheme, where for example, an LDT:Button entity declares the presence of an HTML button that has a click action which invokes a web service request against an action in the WSA.

Service Calls

The ServiceCalls entity of a runtime model contains a set of individual ServiceCall entities. Service calls are actions that invoke web services defined in a web services directory. Note, in the current implementation, a service call can only identify web services that are located in the same web services directory that is managing the execution of the WSA. In one embodiment, a web services engine may make web service requests to web services located in another web services directory, on behalf of a WSA that it is running.

A service call is an action that calls a web service in the web services directory. A service call also represents the input and output data schemas for the named web service, as well as placeholders for the data. And finally, a service call maintains a definition of the assignment of input values to the web service's inputs. These assigned values can either be constants, or references to values in parameters in the runtime model.

A ServiceCall entity contains the following:

```
<ServiceCall>
    <UniqueID/>
    <UserReadableName/>
    <ServiceID>cn=xml_file_service,ou=System Services,
        ou=Bow Street Services,o=BowStreet,c=US</ServiceID>
    <InputDefinitions/>
</ServiceCall>
```

The InputDefinitions entity contains a set of individual DataDefinition entities. These entities contain assignments of constant values to the inputs, as well as assignments of parameters in the runtime model as sources of data for the inputs to the service call.

In one embodiment, the specification of this section allows inclusion of effectivity selection criteria as part of the ServiceID information. In one scheme, a service call identifies a service by its name. It is possible to allow a service call to identify attribute values for attributes such as "release level" as a means of identifying the correct version of a service. In fact, a service call could identify the version of a service by a selection criteria of the following format: latest version, in final testing, as of Mar. 13, 1998.

Triggers (Also Known as Functions)

The Triggers entity of a runtime model contains a set of Action entities. Triggers are the equivalent of methods in a class, and functions in a scripted HTML page.

A trigger is a block of execution logic, with an action that serves as an identifying handle. A runtime model can bind action handles to events, and this is what constitutes the notion of behavior. Behavior in the runtime model is defined to be the binding of actions to events.

In the current implementation of runtime models, a trigger is defined to be a sequence of actions. When the trigger's action is invoked, the system invokes the actions specified by the trigger.

A Trigger entity contains the following:

```
<Trigger>
    <UniqueID/>
    <UserReadableName/>
    <Actions/>
</Trigger>
```

The Actions entity contains information that describes logic and flow of actions that are executed when the Trigger is invoked.

Actions are the handles to functionality defined in the runtime model. At present, there is an action associated with each service call, trigger, and page, in the runtime model.

Parameters

The Parameters entity can contain any type and number of XML entities. This means that a parameter can represent any form of data.

A Parameter is a placeholder for data, but is also a placeholder for the structural representation of the data. In other words, for each parameter, the system maintains an XML entity that defines the allowable content, and structure (i.e. the schema) for data in the parameter.

The structural representation of a parameter can be filled in long before there is data associated with a parameter.

Behaviors

Behavioral entities define the mapping of events to actions. In the current implementation, behavior is only defined in Pages through controls. A control can identify the action associated with one of its events. In the current implementation, these actions can only be web service requests back into the web services engine.

Thus, a method and apparatus for providing network services is described in conjunction with one or more specific embodiments. The invention is defined by the claims and their full scope of equivalents.

SECTION A

Service Definition

This document details the XML representations that make up the service definition. These service descriptions are stored in an LDAP directory that is managed by a BS Server. The descriptions are stored in multiple properties of a Bow Street Service Object. Some of the concepts used to describe the Service schema data are from the W3C Document Content Description for XML submission.

The service definition is an open ended schema that will change over time as Bow Street Software enhances the functionality of its products.

Service Definition

The ServiceDefinition element is used to encapsulate all of the XML data that makes up a service definition.

The ServiceDefinition must contain the following: ID, Description, LastModifiedTime, LastModifiedBy, Type, ClassName, Public, Executable and Category.

The ServiceDefinition may contain the following: InputDataDescriptions, OutputDataDescriptions, ServiceParameters The following is a sample ServiceDefinition for a base JDBC Database Service.

Example:

```xml
<?xml version="1.0"?>
<ServiceDefinition>
    <ID>CN=bowstreet_db_execute_sql,ou=System Services,ou=Live Data Services,ou=Bow Street Services</ID>
    <Description>Runs an SQL statement against a jdbc url</Description>
    <LastModifiedTime>918514813768</LastModifiedTime>
    <LastModifiedBy>uid=mburati,ou=Development,o=BowStreet,c=US</LastModifiedBy>
    <Type>Service</Type>
    <ClassName>com.bowstreet.services.db.ExecuteSQLReadService</ClassName>
    <Category>Base Service</Category>
    <Public>false</public>
    <Executable>true</Executable>
<InputDataDescriptions>
    <DataDescription>
        <Name>DatabaseURL</Name>
        <DataType>String</DataType>
        <Occurs>Required</Occurs>
        <DisplayName>URL</DisplayName>
    </DataDescription>
    <DataDescription>
        <Name>Driver</Name>
        <DataType>String</DataType>
        <Occurs>Required</Occurs>
        <DisplayName>Driver</DisplayName>
    </DataDescription>
    <DataDescription>
        <Name>UserName</Name>
        <DataType>String</DataType>
        <Occurs>Optional</Occurs>
        <DisplayName>User</DisplayName>
    </DataDescription>
    <DataDescription>
        <Name>Password</Name>
        <DataType>String</DataType>
        <Occurs>Optional</Occurs>
        <DisplayName>Password</DisplayName>
    </DataDescription>
    <DataDescription>
        <Name>SQLStatement</Name>
        <DataType>String</DataType>
        <Occurs>Optional</Occurs>
        <DisplayName>SQL</DisplayName>
    </DataDescription>
    <DataDescription>
        <Name>Navigation</Name>
        <DataType>String</DataType>
        <Occurs>Optional</Occurs>
        <DisplayName>Navigation direction</DisplayName>
    </DataDescription>
    <DataDescription>
        <Name>Count</Name>
        <DataType>String</DataType>
        <Occurs>Optional</Occurs>
        <DisplayName>Rows to Fetch</DisplayName>
    </DataDescription>
    <DataDescription>
        <Name>SQLParms</Name>
        <DataType>Vector</DataType>
        <DataDescription>
            <Name>SQLParm</Name>
            <DataType>Specified</DataType>
            <Occurs>ZeroOrMore</Occurs>
            <DisplayName>SQL Parameter</DisplayName>
        </DataDescription>
<Occurs>ZeroOrMore</Occurs>
        <DisplayName>Parameters for SQL Statement</DisplayName>
    </DataDescription>
</InputDataDescriptions>
<OutputDataDescriptions>
    <DataDescription>
        <Name>ResultSet</Name>
        <DataType>ResultSet</DataType>
    </DataDescription>
</OutputDataDescriptions>
<ServiceParameters />
</ServiceDefinition>
```

ID

The ID element is a required tag that is used to uniquely identify this service within a single Directory Server.

Example:

<ID>CN=bowstreet_db_execute_sql,ou=System Services,ou=Live Data Services,ou=Bow Street Services</ID>

LastModifiedTime

The LastModifiedTime element is a required tag that specifies the time that this object was last modified by the Live Data Sever. This time is represented by a long which is the number of milliseconds since Jan. 1, 1970, 00:00:00 GMT.

Example

```xml
<ServiceDefinition>
    <ID>CN=bowstreet_db_execute_sql,ou=System Services,ou=Live Data Services,ou=Bow Street Services</ID>
    <Description>Runs an SQL statement against a jdbc url</Description>
    <LastModifiedTime>918514813768</LastModifiedTime>
```

LastModifiedBy

The LastModifiedBy element is a required tag that specifies the fully distinguished name of the last user to modify this object through the Live Data Sever. This time is represented by a long which is the number of milliseconds since Jan. 1, 1970, 00:00:00 GMT.

Example

```xml
<ServiceDefinition>
    <ID>CN=bowstreet_db_execute_sql,ou=System Services,ou=Live Data Services,ou=Bow Street Services</ID>
    <Description>Runs an SQL statement against a jdbc url</Description>
    <LastModifiedTime>918514813768</LastModifiedTime>
```

The Type element is a required tag that specifies the type of service associated with this definition. The Type can be one of the following Service, Model or System.

Example

```xml
<ServiceDefinition>
    <ID>CN=bowstreet_db_execute_sql,ou=System Services,ou=Live Data Services,ou=Bow Street Services</ID>
    <Type>Service</Type>
```

The Category element is a required tag that specifies the category in which to associate this definition. The Category can be any text value.
Example

```
<ServiceDefinition>
    <ID>CN=bowstreet_db_execute_sql,ou=System Services,ou=
    Live Data
Services,ou=Bow Street Services</ID>
    <Category>Base Service</Category>
```

ClassName

The ClassName element is a required tag that specifies the Java class associated with each service this element is a child element of the ServiceDefinition. The ClassName must be represented by the full path name of the class as shown in the example below.
Example<ServiceDefinition>

```
    <ID>CN=bowstreet_db_execute_sql,ou=System Services,ou=
    Live Data
Services,ou=Bow Street Services</ID>
    <Description>Runs an SQL statement against a jdbc url</
    Description>
    <LastModifiedTime>918514813768</LastModifiedTime>
<LastModifiedBy>uid=mburati,ou=Development,o=BowStreet,c=US</
LastModifiedBy>
    <Type>Service</Type>
<ClassName>com.bowstreet.services.db.ExecuteSQLReadService</
ClassName>
```

Public

The Public element is a required tag that specifies whether this service is publicly available for execution. See the security document for more details on this element. The valid Public text values are true and false.
Example

```
<ServiceDefinition>
    <ID>CN=bowstreet_db_execute_sql,ou=System Services,ou=
    Live Data
Services,ou=Bow Street Services</ID>
    <Category>Base Service</Category>
    <Public>false</public>
```

Executable

The Executable element is a required tag that specifies whether this service is currently executable. See the security document for more details on this element. The valid Executable text value are true or any other string value.
Example

```
<ServiceDefinition>
    <ID>CN=bowstreet_db_execute_sql,ou=System Services,ou=Live
    Data
Services,ou=Bow Street Services</ID>
    <Category>Base Service</Category>
    <Executable>true</Executable>
```

InputDataDescriptions

The InputDataDescriptions element is an optional tag that will contain only child elements of type DataDescription. This element allows the service to specify an optional list of input parameters, which will be supplied at runtime and passed into the service as input data. Note: Input from a user will not be passed into this service unless the data inputs are defined. The example below shows the InputDataDescriptions with a DataDescription child.
Example:

```
<InputDataDescriptions>
    <DataDescription>
        <Name>DatabaseURL</Name>
        <DataType>String</DataType>
        <Occurs>Required</Occurs>
        <DisplayName>URL</DisplayName>
    </DataDescription>
```

DataDescription

The DataDescription element is an optional tag that will contain the actual description of each individual input parameter. There can be zero or more of these elements beneath the InputDataDescriptions element. The elements that can be contained as DataDescription children are as follows.

Name—The Name element identifies the name of the input parameter.
Example: <Name>DatabaseName</Name>
DataType—The DataType element identifies the primitive data type of the input parameter.
The following is an initial list of proposed supported data types which have a corresponding Java class definition. This list is subject to change and at this time not all these types are supported in the base line development effort.

String
Byte
Byte[ ]
Boolean
Double
Float
Integer
Long
Date
Time
Hashtable
Vector
ResultSet
ElementList
Struct
Example: <DataType>String</DataType>
See Complex Data Types section for more information.
Occurs—The Occurs element indicates whether the presence of this input parameter is required. This can take one of two values
Required: Occurs exactly once
Optional: Occurs zero or one time
OneOrMore: Occur one or more times
ZeroOrMore: Occur zero or more times
The default for this is Required.
Example: <Occurs>Required</Occurs>
DisplayName—The DisplayName element is used to specify a user-friendly name.
Example: <DisplayName>Database Name</DisplayName>
Default—The Default element is used to give the input parameter a default value. The Default element can contain an attribute to specify if the default value is fixed which if true will indicate the default value is the only one allowed. If the fixed attribute is not specified it is value will be set to false.
Example: <Default Fixed=true>Bow Street Inc.</Default >
SelectList—The SelectList element is used to specify a list of fixed inputs which are valid as input for this parameter.

This list can be used by an application to allow the user to select an item from this list. The SelectList can contain one ore more Item element used to identify each valid parameter.
Example:

```
<SelectList>
    <Item>USA</Item>
    <Item>USSR</Item>
</SelectList>
```

Min—The Min element is used to specify a lower valid boundary for this input parameter. The meaning of this value may vary for each DataType.
Example: <Min>5</Min>
Max—The Max element is used to specify an upper valid boundary for this input parameter. The meaning of this value may vary for each DataType.
Example: <Max>100</Max>
MinExclusive—The MinExclusive element is used to specify a less-than valid boundary for this input parameter. The meaning of this value may vary for each DataType.
Example: <MinExclusive >5</MinExclusive >
MaxExclusive—The MaxExclusive element is used to specify a greater-than valid boundary for this input parameter. The meaning of this value may vary for each DataType.
Example: <MaxExclusive >25</MaxExclusive >
MapsTo—The MapsTo element is used by the Extender service to map input data from the Extender service to the input parameter of the base service. The following example maps the CountryName Input parameter in the Extender service to the SQLParms parameter in the base service, which in this example is the JDBCDatabaseService.
Example:

```
<DataDescription>
    <Name>CountryName</Name>
    <DataType>String</DataType>
    <MapsTo>SQLParms</MapsTo>
    <DisplayName>Customer Country</DisplayName>
</DataDescription>
```

OutputDataDescriptions
The OutputDataDescriptions element is an optional tag that will contain only child elements of type DataDescription. This element allows the service to specify an optional list of output data, which the service will generate at runtime and return as output after the service is executed. The example below shows the OutputDataDescriptions with a DataDescription child.
Example:

```
<OutputDataDescriptions>
<DataDescription>
    <Name>DataSet</Name>
    <DataType>ResultSet</DataType>
</DataDescription>
</OutputDataDescriptions>
```

DataDescription
The DataDescription element is an optional tag that will contain the actual description of each individual output parameter. There can be zero or more of these elements beneath the OutputDataDescriptions element. The elements that can be contained as DataDescription children are described in the previous DataDescription Section.

ServiceParameters
The ServiceParameters attribute block of a service definition is used to hold service specific parameters that help the service driver complete its implementation. For instance, the Template Runner service stored the template itself as a child of <ServiceParameters>in the service definition. Certain Base Services are abstract in terms of their Service Driver implementation (cannot be executed in their raw form—they must be cloned and extended with certain information). For instance, a Service Definition exists for the Base Command Executable Runner service (a service driver that can execute binary applications stored on the server system). That service definition itself is non-executable (has the execute attribute shut off) since it cannot run without the Command pathname being specified as a parameter to the service definition (it would be too dangerous to allow the user to enter in any command name in the inputs of this service). So, in order to build an executable version of this service, one would clone the original service definition, mark the new definition public, and define the Command Parameter in the new service definition.
Example:
Base Command Runner Service Parameters (non-executable—exists for template of extended service definitions only)

```
<ServiceParameters>
    <Parameters>
        <Parameter>Command
            <Value> FILL IN YOUR COMMAND PATH HERE </Value>
            <Description>Full pathname to the command to be executed</Description>
        </Parameter>
    </Parameters>
</ServiceParameters>
```

Above Command Runner Service Parameters—cloned and extended with a specific Command to run (executable service). In this case, we specified a hard-coded argument to always pass to the command (send).

```
<ServiceParameters>
    <Parameters>
        <Parameter>Command
            <Value>c:\winnt\system32\net.exe send</Value>
            <Description>Full pathname to the command to be executed</Description>
        </Parameter>
    </Parameters>
</ServiceParameters>
```

Complex Data Types
ElementList—The ElementList data type is used to describe a list of XML children element in which the names of the element are unknown at design time.
Here is an example of XML, which can be described by using the ElementList data type. The following DSML data was produced by the LDAP Search service. This service produces a list (Vector) of objects containing an unknown element list of LDAP attributes.

```
<?xml version="1.0" encoding="Cp1252"?>
<dsml:Objects>
```

-continued

```
    <dsml:Object>
        <dsml:dn>uid=tbeauvais,ou=development,o=bowstreet,c=us</
dsml:dn>
        <dsml:sn>Beauvais</dsml:sn>
        <dsml:objectclass>top</dsml:objectclass>
        <dsml:objectclass>person</dsml:objectclass>
        <dsml:objectclass>organizationalPerson</dsml:objectclass>
        <dsml:objectclass>inetOrgPerson</dsml:objectclass>
        <dsml:uid>tbeauvais</dsml:uid>
        <dsml:mail>tbeauvais@bowstreet.com</dsml:mail>
        <dsml:givenname>Thomas</dsml:givenname>
        <dsml:cn>Thomas Beauvais</dsml:cn>
    </dsml:Object>
</dsml:Objects>
```

The previous DSML LDAP data can be described in a service data definition by the following:

```
<DataDescription>
    <Name>dsml:Objects</Name>
    <DataType>Vector</DataType>
        <DataDescription>
            <Name>dsml:Object</Name>
            <DataType>ElementList</DataType>
            <Occurs>ZeroOrMore</Occurs>
        </DataDescription>
<Occurs>OneOrMore</Occurs>
</DataDescription>
```

Struct—The Struct data type is used to describe a data structure within XML similar to describing a structure in C.

The following example of XML data shows Employees, which is a List of employee elements, which contains a structure of employee information. The employee information is made up of a Name which is a structure of First and Last elements and then Address, City, State and Zip which are all Strings.

```
<Employees>
    <Employee>
        <Name>
            <First>Tom</First>
            <Last>Beauvais</Last>
        </Name>
        <Address>1 Harbour Place</Address>
        <City>Portsmouth</City>
        <State>NH</State>
        <Zip>03801</State>
    </Employee>
    <Employee>
        <Name>
            <First>Joe</First>
            <Last>User</Last>
        </Name>
        <Address>1 Harbour Place</Address>
        <City>Portsmouth</City>
        <State>NH</State>
        <Zip>03801</State>
    </Employee>
</Employees>
```

The previous XML data can be described in a service data definition by the following:

```
<DataDescription>
    <Name>Employees</Name>
```

```
    <DataType>Vector
        <DataDescription>
            <Name>Employee</Name>
        <DataType>Struct
            <DataDescription>
                <Name>Address</Name>
            <DataType>Struct
                <DataDescription>
                    <Name>First</Name>
                    <DataType>String</DataType>
                    <Occurs>Required</Occurs>
                </DataDescription>
                <DataDescription>
                    <Name>Last</Name>
                    <DataType>String</DataType>
                    <Occurs>Required</Occurs>
                </DataDescription>
            </DataType>
            <Occurs>Required</Occurs>
        </DataDescription>
        <DataDescription>
            <Name>Address</Name>
            <DataType>String</DataType>
            <Occurs>Required</Occurs>
        </DataDescription>
        <DataDescription>
            <Name>City</Name>
            <DataType>String</DataType>
            <Occurs>Required</Occurs>
        </DataDescription>
        <DataDescription>
            <Name>State</Name>
            <DataType>String</DataType>
            <Occurs>Required</Occurs>
        </DataDescription>
        <DataDescription>
            <Name>Zip</Name>
            <DataType>String</DataType>
            <Occurs>Required</Occurs>
        </DataDescription>
    </DataType>
    <Occurs>ZeroOrMore</Occurs>
</DataDescription>
</DataType>
<Occurs>ZeroOrMore</Occurs>
</DataDescription>
```

Recursive Descriptions—Recursive descriptions are used to describe XML data in which the data can contain instances of it self.

The following example shows that Containers contain a list of Container elements, which intern can contain a Containers element. Is this confusing or what?

```
<Containers>
    <Container>
        <dsml:dn>o=BowStreet,c=US</dsml:dn>
        <dsml:cn>o=BowStreet</dsml:cn>
        <Containers>
            <Container>
                <dsml:dn>ou=Netscape Servers,o=BowStreet,
c=US</dsml:dn>
                <dsml:cn>ou=Netscape Servers</dsml:cn>
            </Container>
            <Container>
                <dsml:dn>ou=Development,o=BowStreet,
c=US</dsml:dn>
                <dsml:cn>ou=Development</dsml:cn>
            <Containers>
                <Container>
<dsml:dn>ou=Services,ou=Development,o=BowStreet,c=US</dsml:dn>
                    <dsml:cn>ou=Services</dsml:cn>
                </Container>
            </Containers>
```

-continued

```
        </Container>
      </Container>
    </Container>
</Containers>
```

The previous XML data can be described in a service data definition by the following:

```
<DataDescription>
    <Name>Containers</Name>
    <DataType>Vector
        <DataDescription>
            <Name>Container</Name>
            <DataType>Struct
                <DataDescription>
                    <Name>dsml:dn</Name>
                    <DataType>String</DataType>
                    <Occurs>Required</Occurs>
                </DataDescription>
                <DataDescription>
                    <Name>dsml:cn</Name>
                    <DataType>String</DataType>
                    <Occurs>Required</Occurs>
                </DataDescription>
                <DataDescription>
                    <Name>Containers</Name>
                    <DataType>Containers</DataType>
                    <Occurs>Required</Occurs>
                </DataDescription>
            </DataType>
            <Occurs>ZeroOrMore</Occurs>
        </DataDescription>
    </DataType>
    <Occurs>ZeroOrMore</Occurs>
</DataDescription>
Other Example Data
ResultSet
<Employees>
    <Employee>
        <Name> Tom Beauvais</Name>
        <Address>1 Harbour Place</Address>
    </Employee>
</Employees>
<DataDescription>
    <Name>Employees</Name>
    <DataType>ResultSet
        <DataDescription>
            <Name>Name</Name>
            <DataType>String</DataType>
            <Occurs>Required</Occurs>
        </DataDescription>
        <DataDescription>
            <Name>Address</Name>
            <DataType>String</DataType>
            <Occurs>Required</Occurs>
        </DataDescription>
    </DataType>
    <Occurs>ZeroOrMore</Occurs>
</DataDescription>
```

What is claimed is:

1. A system comprising:

a directory of identifiers and metadata to a plurality of network services, wherein said plurality of network services receive Extensible Markup Language (XML) inputs and produce XML outputs;

an engine, comprising a plurality of network service drivers, for receiving requests, wherein said engine uses said identifiers in said directory to direct said requests to access said plurality of network services when requested, and constructs a state storing session for interfacing with said plurality of network services by using one of said plurality of network services to transform an XML runtime model into said state storing session, wherein said XML runtime model defines interaction between said state storing session and said plurality of network services, wherein said state storing session uses one of said plurality network service drivers to interface with each of said plurality of network services via stateless network protocols and said state storing session is configured from said metadata from said directory; and a plurality of network service providers, accessible to said plurality of network service drivers, for providing network services identified in said directory.

2. The system of claim 1 wherein said metadata defines a schema of a network service's input and output interfaces.

3. The system of claim 2 wherein said metadata further includes configuration parameters for configuring a network service driver associated with one of said plurality of network services.

4. The system of claim 1 wherein said plurality of network services are accessible via an Application Program Interface (API).

5. The system of claim 1 wherein said plurality of network services are Extensible Markup Language (XML) based network services.

6. The system of claim 1 wherein each of said plurality of network service providers comprises an entity that is capable of receiving some information and providing a response.

7. The system of claim 1 wherein said engine interprets said requests and determines what network services are needed, directs requests to appropriate network services via said plurality of network service drivers, and builds responses into replies.

8. The system of claim 1 wherein said requests comprise Hypertext Transfer Protocol (HTTP) requests.

9. A computer Program product comprising:

a computer usable medium having computer readable program code embodied therein configured for accessing a plurality of network services, said computer program product comprising:

computer readable code configured to cause a computer to store identifiers and metadata of a plurality of network services in a directory, wherein said plurality of network services receive Extensible Markup Language (XML) inputs and produce XML outputs and said plurality of network services are provided by a plurality of network service providers;

computer readable code configured to cause a computer to provide requests to an engine, comprising a plurality of network service drivers, wherein said engine uses said identifiers to direct said requests to access said plurality of network services when requested; and computer readable code configured to cause a computer to construct a state storing session for interfacing with said plurality of network services, wherein said state storing session is created by using one of said plurality of network services to transform an XML runtime model into said state storing session, wherein said XML runtime model defines interaction between said state storing session and said plurality of network services, wherein said state storing session uses one of said plurality network service drivers to interface with said plurality of network services via stateless network protocols and said state storing session is configured from said metadata from said directory;

wherein said plurality of network services interface with said engine via said plurality of network service drivers based on said requests.

10. The computer program product of claim 9 wherein said metadata defines a schema of a service's input and output interfaces.

11. The computer program product of claim 10 wherein said metadata further includes configuration parameters for configuring a network service driver associated with one of said plurality network services.

12. The computer program product of claim 9 wherein said plurality of network services are accessible via an Application Program Interface (API).

13. The computer program product of claim 9 wherein said plurality of network services are Extensible Markup Language (XML) based network services.

14. The computer program product of claim 9 wherein each of said a plurality of network service providers comprises an entity that is capable of receiving some information and providing a response.

15. The computer program product of claim 9 wherein said engine interprets said requests and determines what network services are needed, directs request to appropriate network services via said plurality of service drivers, and builds responses into replies.

16. The computer program product of claim 9 wherein said requests comprise Hypertext Transfer Protocol (HTTP) requests.

* * * * *